Nov. 24, 1953  D. W. BLACK  2,660,698
SELENIUM RECTIFIER
Filed Oct. 29, 1951

INVENTOR.
D. W. BLACK
BY Philip M. Bolton
ATTORNEY

Patented Nov. 24, 1953

2,660,698

UNITED STATES PATENT OFFICE 2,660,698

SELENIUM RECTIFIER

Donald W. Black, Pompton Plains, N. J., assignor to Federal Telephone and Radio Corporation, New York, N. Y., a corporation of Delaware Application October 29, 1951, Serial No. 253,612

4 Claims. (Cl. 317—241)

This invention relates to improvements in selenium rectifiers, and more particularly to the introduction of a novel lacquer as a barrier layer between the selenium and counterelectrode layers of such rectifiers.

It is believed that the effective rectifying action of dry rectifiers, such as a selenium rectifier, largely depends upon the formation of a so-called barrier layer between the layer of selenium and the applied counterelectrode, the latter generally consisting of a cadmium containing alloy. This barrier layer is accordingly strengthened by the "forming" of the rectifier, which comprises applying a voltage to the same in the reverse, or poorly conducting direction for a period of time.

It has been found that the effective rectifying action of such selenium rectifiers can be improved by interposing an artificial barrier layer, for example, by the deposition of a lacquer on the selenium before the application of the counterelectrode. Lacquers for this purpose which have been proposed previously have contained a wide variety of constituents, some of which have resulted in rectifiers of somewhat improved characteristics.

An object of the present invention is to provide a new lacquer for use as an artificial barrier layer having improved forward and reverse characteristics over a longer period of time than rectifiers heretofore known.

A further object of this invention is to provide a lacquer wherein the pH may be adjusted and controlled while said lacquer is in solution.

A still further object of my invention is to provide a novel process for making a rectifier plate.

Figure 2:
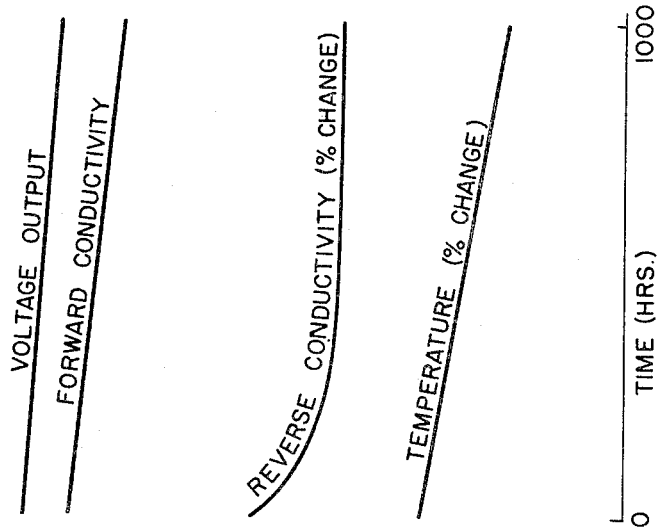
Figure 1:
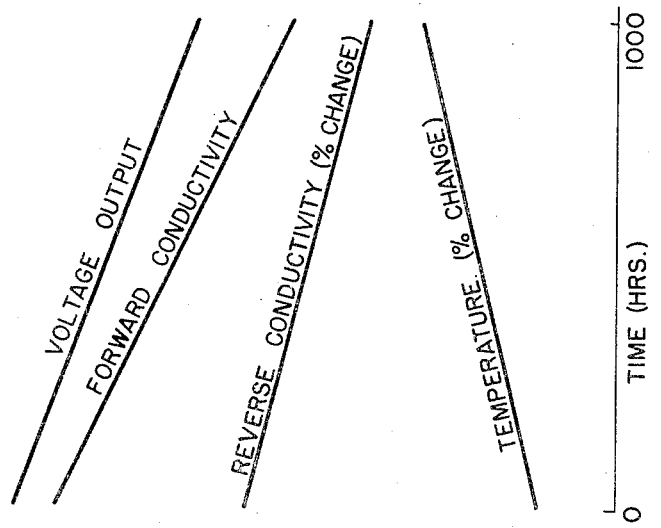

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 shows characteristic curves of the standard type rectifier in graphical representation; and Fig. 2 shows similar curves for the rectifier of this invention.

The new lacquer process comprises as its novel essential ingredients a polyamide, which for example may be one of the class of compounds commonly known by its trade-mark name Nylon, in solution.

In the preferred form of lacquer used, there is added to the essential ingredients above-named, a material such as a nitro-paraffin. This carrier may be added to the lacquer in the form of a nitro-methane solution. A preferred composition of the lacquer embodying such a carrier would be 10 cc. of a polyamide solution comprising by weight, 2 grams of a soluble Nylon (designated as FM-6501 by the Du Pont Corp.) in 30 grams of isopropyl alcohol, 6 grams of water and 4 grams of furfuryl alcohol, while maintaining the solution at 50-60° C.; then mixing the above solution with 400 cc. of a carrier comprising isopropyl alcohol and nitro-methane in the ratio of three parts to one by volume respectively. The pH of the lacquer solution is then adjusted to a desired value by adding thereto an appropriate amount of ammonium hydroxide. FM-6501 Nylon is soluble in phenols and lower aliphatic alcohols. The lower alcohols, methanol and ethanol, are the best solvents; normal propanol and isopropanol have good solvency for these Nylons, but are inferior to methanol and ethanol in this respect. Solutions containing up to 30% Nylon can be prepared by warming the resins in any of these alcohols. Water, hydrocarbons, and ketones are miscible with these solutions to the extent of about 25% of the total solvent. The use of 20-30% water actually improves solution characteristics.

Solutions tend to gel on prolonged storage but can be made fluid again on warming. Gelation time depends on temperature, resin concentration, and on the particular resin and solvent used.

This Nylon resin is insoluble in most solvents, including aromatic and aliphatic hydrocarbons, halogenated hydrocarbons, ketones, esters, water, and carbon disulfide. The resin is particularly resistant to hydrocarbon solvents, showing negligible swelling or change of any kind on prolonged exposure to either aliphatic or aromatic hydrocarbons.

While a specific composition of the lacquer has been given only by way of example, a range of the ingredients which have been found satisfactory for the purpose are as follows:

Nylon concentrate (proportions by weight)

4–7% Nylon
    65–75% isopropyl alcohol
    10–16% water
    7–12% furfuryl alcohol Carrier (proportions by volume)

1½–4½ parts isopropyl alcohol
    ½–1½ parts nitro-methane

The lacquer is then prepared by mixing approximately 10–20 cc. of Nylon concentrate with approximately 350–450 cc. of the carrier. The pH of the composition, when taking the mean of the above ranges, is approximately 5 and can be varied to a preferred value (usually 7) by adding an appropriate amount of ammonium hydroxide.

It will be appreciated that, upon evaporation of the volatile portions in the lacquer the polyamide resin remains as the film-forming material, together with some residual solvents and/or reaction products thereof.

In accordance with my invention, the process of making the rectifier plate consists in mixing the Nylon solution with the carrier solution, in the above mentioned proportions, and adding thereto ammonium hydroxide to vary the pH factor of the solution to a desired value, and then "forming" the rectifier by immersing the rectifier plate in oil (preferably transformer oil) and applying across the plate a given current of pulsating D. C., e. g. 2 amps., until approximately 50 volts is built up. At this voltage the rectifier is properly formed having a set of desirable characteristics (Figs. 1 and 2) and is removed from the source of power. During the process the oil should be maintained at a fairly even temperature, approximately 40–50° C.

The characteristics of the rectifier are a function of the pH and the forming voltage, therefore the pH and forming voltage should be adjusted for various types of rectifiers in accordance with the requirements and specifications of the job for which it will be used.

By using the preferred form of lacquer and electro-forming described above, substantially improved rectifiers have been obtained. For example, comparing Figs. 1 and 2, it is seen that the rectifier of the present invention has considerably less temperature change, or the change in power losses becomes less with age, than the known rectifiers. An important result of the temperature change is that in my invention the voltage output and forward conductivity are nearly constant whereas the known rectifiers supply an output voltage and forward conductivity decreasing with age. Another important characteristic illustrated by the graphs is the reverse conductivity of the rectifiers. The reverse conductivity characteristic of my invention is seen to initially change parabolically and then to become constant with age whereas the known rectifiers exhibit a continuously changing characteristic.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A rectifier having a base plate, a layer of selenium on the base plate, a counterelectrode layer on the selenium and an intermediate layer between the selenium and the counterelectrode consisting essentially of a high molecular weight linear polymeric carbonamide deposited from a solution containing a high molecular weight linear polymeric carbonamide soluble in the lower aliphatic alcohols.

2. A rectifier having a base plate, a layer of selenium on the base plate, a counterelectrode layer on the selenium and an intermediate layer consisting of the end products of the evaporation of a solution consisting essentially of a high molecular weight linear polymeric carbonamide soluble in the lower aliphatic alcohols together with a nitro-paraffin.

3. A rectifier according to claim 2 in which the solution has been adjusted to a preferred pH of 7.

4. A rectifier having a base plate, a layer of selenium on the base plate, a counterelectrode layer on the selenium and an intermediate layer consisting essentially of a linear polymeric carbonamide of the type soluble in the lower aliphatic alcohols.

DONALD W. BLACK.

References Cited in the file of this patent

UNITED STATES PATENTS

| Number | Name | Date |
|---|---|---|
| 2,320,088 | Leekley | May 25, 1943 |
| 2,467,186 | Cairns | Apr. 12, 1949 |